March 30, 1965 — R. J. COFFEY — 3,175,353
CHAIN-MAKING APPARATUS
Filed May 16, 1961 — 7 Sheets-Sheet 1

INVENTOR.
Ralph J. Coffey
BY
ATTORNEYS

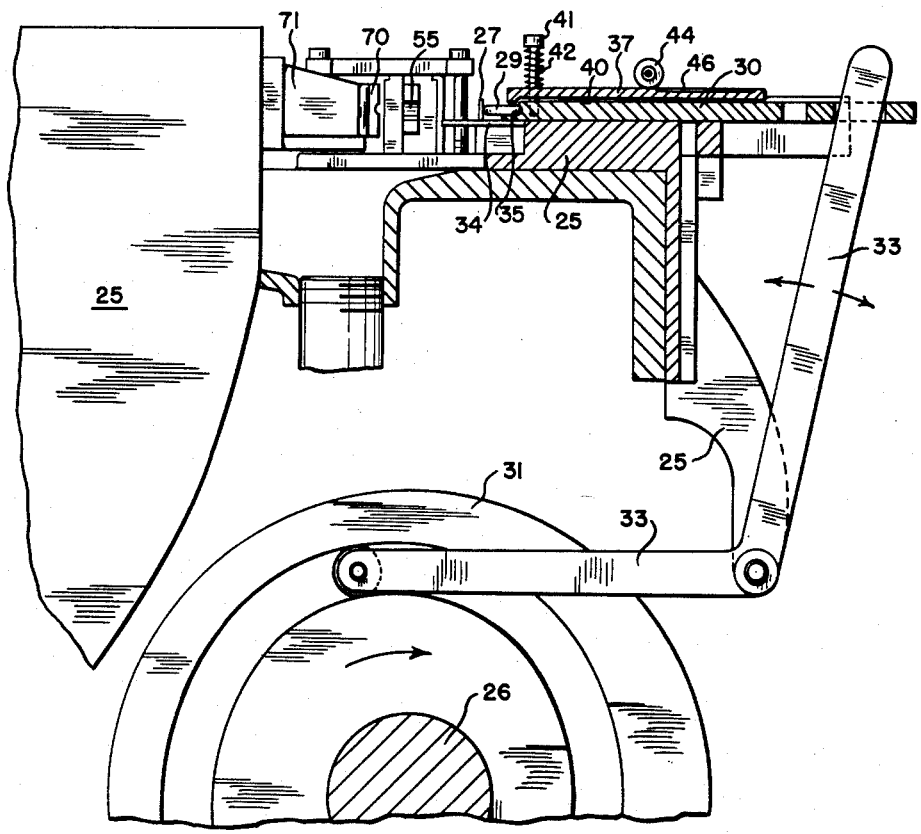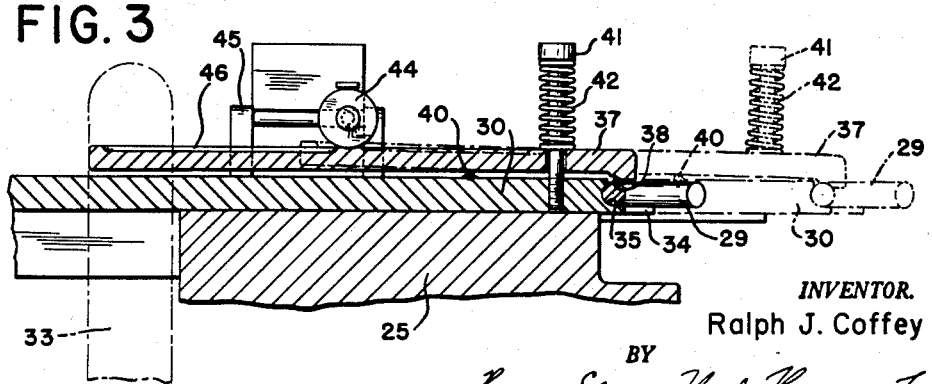

March 30, 1965     R. J. COFFEY     3,175,353

CHAIN-MAKING APPARATUS

Filed May 16, 1961     7 Sheets-Sheet 3

*INVENTOR.*
Ralph J. Coffey
BY
ATTORNEYS

March 30, 1965     R. J. COFFEY     3,175,353

CHAIN-MAKING APPARATUS

Filed May 16, 1961     7 Sheets-Sheet 4

INVENTOR.
Ralph J. Coffey
BY
ATTORNEYS

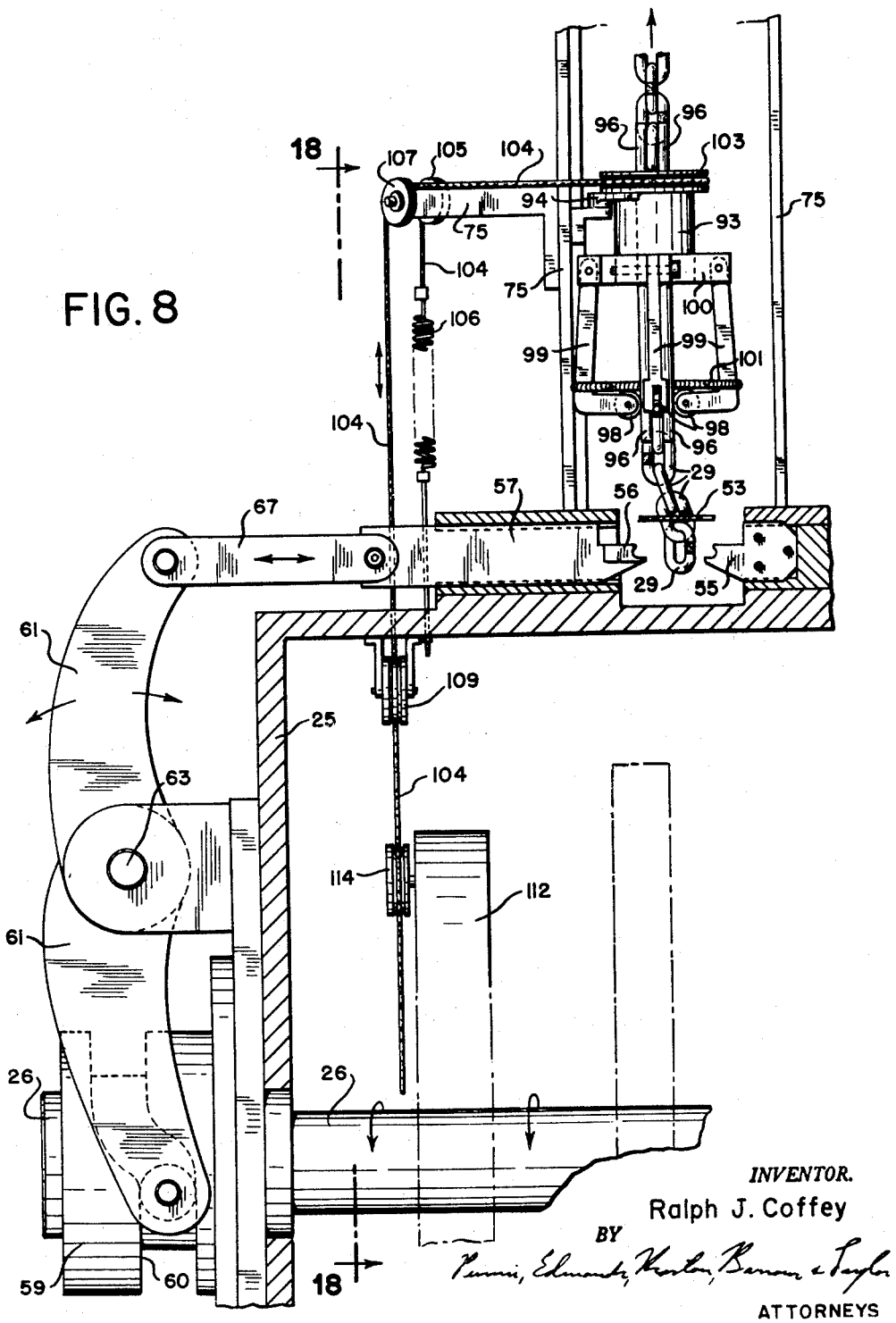

March 30, 1965 R. J. COFFEY 3,175,353
CHAIN-MAKING APPARATUS
Filed May 16, 1961 7 Sheets-Sheet 6
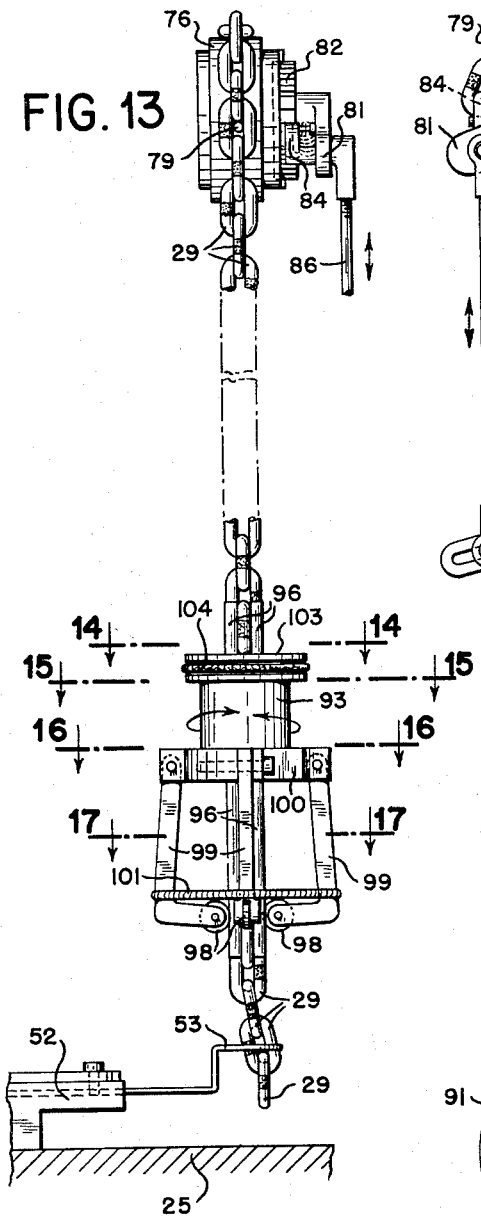
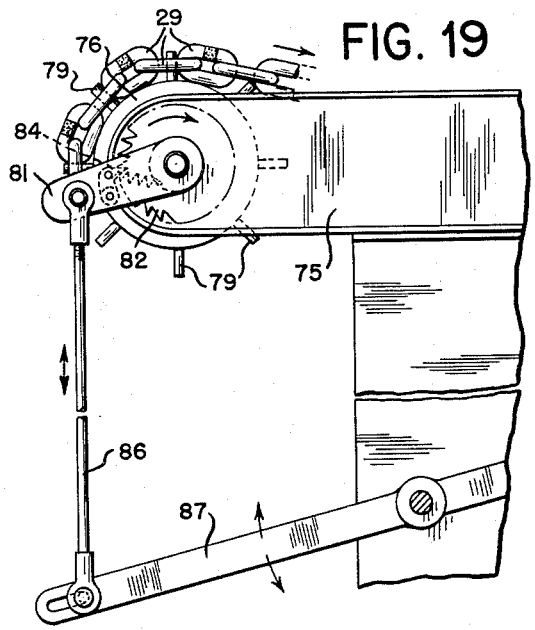
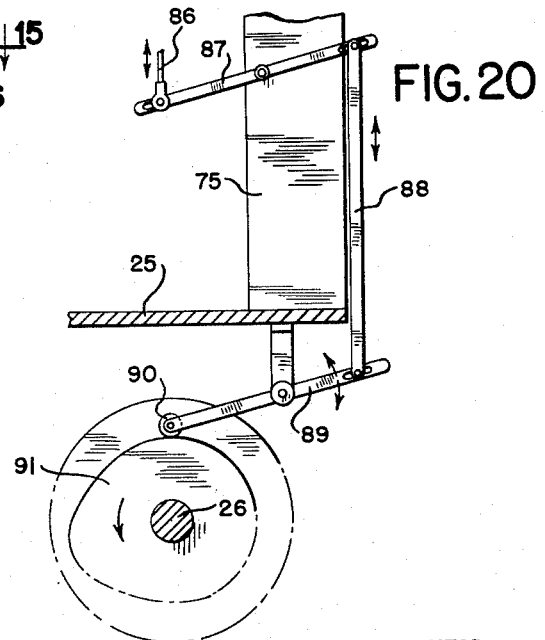
INVENTOR.
Ralph J. Coffey
BY
ATTORNEYS March 30, 1965     R. J. COFFEY     3,175,353
CHAIN-MAKING APPARATUS Filed May 16, 1961     7 Sheets-Sheet 7

*INVENTOR.*
Ralph J. Coffey
BY
ATTORNEYS

United States Patent Office 3,175,353
Patented Mar. 30, 1965

3,175,353
CHAIN-MAKING APPARATUS
Ralph J. Coffey, York, Pa., assignor to American Chain
& Cable Company, Inc., a corporation of New York
Filed May 16, 1961, Ser. No. 110,454
7 Claims. (Cl. 59—22)

This invention relates to apparatus for making chain and, more particularly, to fully automatic chain-making apparatus capable of forming substantially C-shaped lugs successively into interconnected links of finished chain.

It is customary in the manufacture of chain to make substantially C-shaped lugs out of short lengths of rod and then to form such lugs into interconnected chain links by a number of separate working steps. The general purpose of this invention is to provide a single forming machine which carries out all the working steps necessary to form C-shaped lugs into chain and, more importantly, does so in an integrated sequence of fully automatic working steps. This object is achieved by the use of several distinctly new machine elements and assemblies which function together in a novel combination.

The new apparatus for forming substantially C-shaped lugs into interconnected links of chain comprises a frame and a reciprocable slide mounted on the frame for moving each lug successively into forming position. Positioning means are included on the frame for locating the endmost link of previously formed chain so that the opposed lug end portions fit about that link when the lug reaches forming position. Closing dies on the frame are provided for forcibly closing the opposed lug end portions through the endmost link. Welding means engageable with the closed lug end portions are included for welding them together. Also, the apparatus is provided with indexing means for operatively relocating the chain with respect to the positioning means preparatory to the formation of the next link. The apparatus further includes synchronized driving means for actuating each of the slide, positioning means, closing dies, welding means and indexing means.

The invention also provides the combination of specific indexing means with apparatus for forming substantially C-shaped lugs into interconnected links of chain. Such indexing means serve to operatively relocate the previously formed chain after each successive link is formed. Broadly stated, it comprises a structure from which an end portion of the chain depends. Lifting means are included for raising the depending portion of the chain the distance of one link after each link is formed. The indexing means further include rotating means for turning the depending portion of the chain a quarter turn after each link is formed.

New positioning means are provided by the invention for locating a depending end portion of previously formed chain. Such positioning means comprises a frame and a reciprocable slide mounted on the frame. A forked member is mounted on this slide. Actuating means are included for advancing the forked member into engagement with the depending portion of the chain to locate that portion with respect to the frame.

It is further provided by the invention that apparatus for forming substantially C-shaped lugs into interconnected links of chain, wherein each lug is moved into forming position by a reciprocable slide mounted on a frame, be combined with novel clamping means for holding each lug on the slide. Such clamping means comprises a lever arm on the slide. This lever arm and the slide define respective opposed holding surfaces at one end thereof. Spring means bias the lever arm to urge the holding surfaces together. Also, displacement means on the frame in engagement with the lever arm are included for moving the holding surfaces apart against the force of the spring means before the slide moves the lug toward forming position.

All of these various novel features of the invention contribute to the many advantages which result from the new automatic chain-making apparatus. Since each of the various integrated steps of the process are carried out by assemblies driven from a common drive shaft, exceptional uniformity in quality and construction is imparted to the chain made by the apparatus. The invention includes within its scope the total combination of the cooperating assemblies and, in addition, the various assemblies themselves. In the entire combination, however, the various assemblies function together to provide advantages which heretofore have not been achieved in conventional chain-making machinery.

A preferred embodiment of the apparatus of the invention is described hereinbelow with reference to the accompanying drawings, wherein FIG. 1 is a plan view of the apparatus;

FIG. 2 is a fragmentary section taken along the line 2—2 of FIG. 1;

FIG. 3 is a fragmentary section taken along the line 3—3 of FIG. 1;

FIG. 8 is a fragmentary section taken along the line 9—9 of FIG. 1 and showing the closing die operating means;

FIG. 13 is a fragmentary section partly broken away taken along the line 13—13 of FIG. 1 and showing the indexing means;

FIG. 19 is a fragmentary elevation partly broken away of the winch member included in the indexing means for raising the formed chain; and FIG. 20 is a fragmentary section of the cam means for actuating the winch member of FIG. 19.

Figure 1:
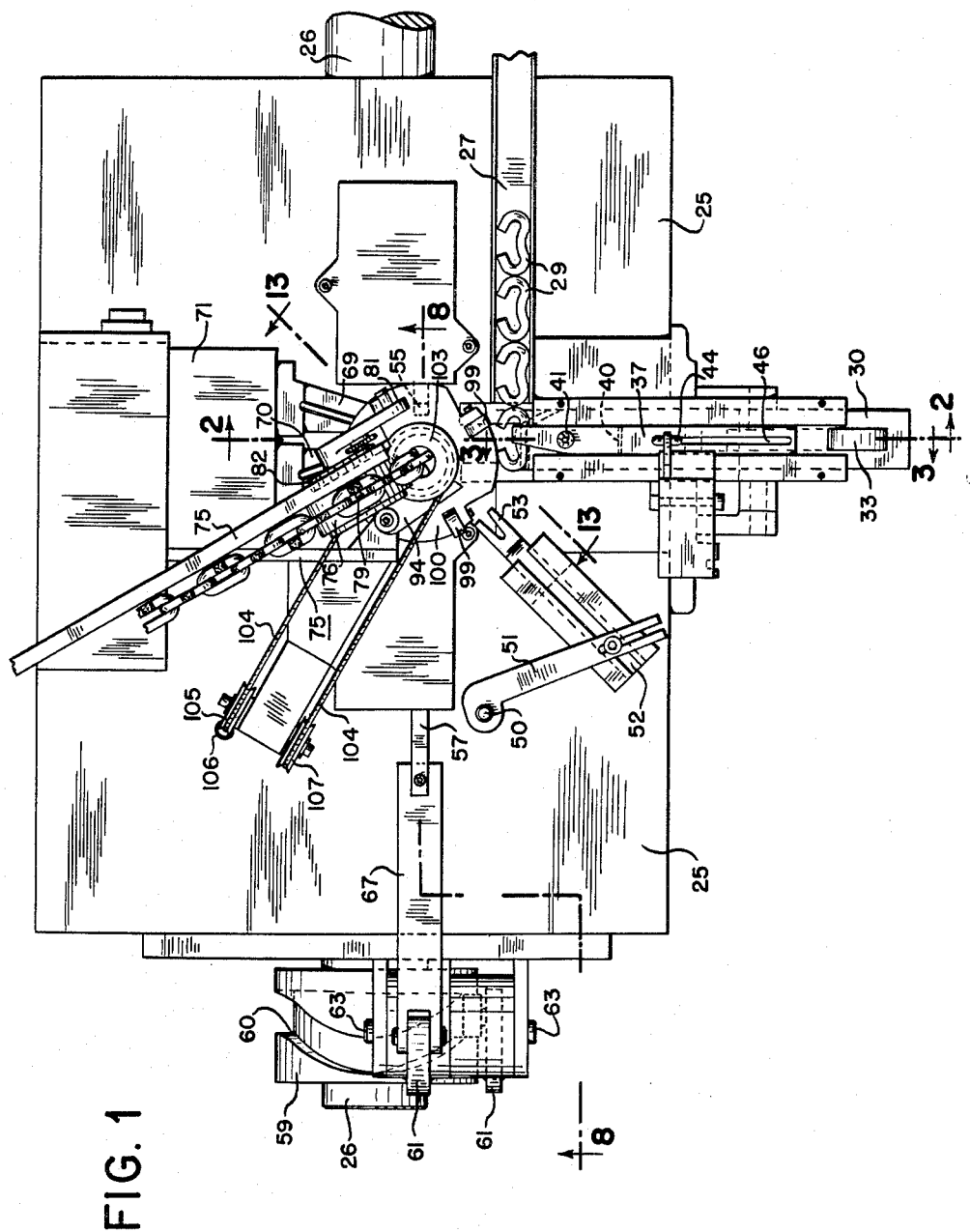

Referring first to FIGS. 1 through 5, the new apparatus includes a heavy frame 25 in which is journaled a main drive shaft 26 driven by a suitable motor. An inlet feeding channel 27, supported on the upper surface of the frame 25, is adapted to receive a plurality of substantially C-shaped lugs 29 arranged uniformly end-to-end. The lugs 29 are fed successively along the channel 27 from their previous forming station in any manner.

Slidably mounted on the frame 25 is a first reciprocable slide 30 adapted to move back and forth laterally relative to the channel 27 at the exit end thereof. As shown in FIG. 2, the slide 30 is driven by means of a first cam 31 affixed to the drive shaft 26 within the frame 25. A bell-crank 33 fulcrumed to the frame 25 is displaced at one end by the cam 31 and extends at its opposite end to the slide 30. Thus, rotation of the primary shaft 26 oscillates the bell-crank and thereby reciprocates the slide 30 on the frame 25. In its retracted position, the slide 30 withdraws over a stationary lip element 34 (FIG. 3) affixed to the frame. This element 34 supports each successive lug 29 during feeding such that the central portion of the C-shaped lug overlays a holding surface 35 on the outer end of the slide 30 and the open portion of the lug faces in the direction of forward motion of the slide 30.

Clamping means are included in association with the slide 30 to retain the lug on the slide during its forward reciprocation. Thus, an elongated pivotal clamping element 37 is longitudinally disposed on the upper surface of the slide 30 with its outer end projecting over the holding surface 35. A second holding surface 38, opposed to the holding surface 35, is defined on this projecting end of the clamping element 30 so that the central portion of each lug 29 can be gripped between the clamping element and the slide. Intermediate its ends, the clamping element 37 is pivoted about a small fulcrum 40 laterally arranged on the upper surface of the slide 30. Extending through a bore in the clamping element 37 between the fulcrum 40 and the holding surface 38 is a bolt 41 which is threaded into the slide 30. A compression spring 42 is disposed concentrically about the bolt 41 between its head and the upper surface of the clamping element 37. Thus, the spring 42 biases the clamping element 37 about the fulcrum 40 such that the holding surface 38 at the end thereof is urged toward the holding surface 35 at the corresponding end of the slide 30. The lug 29 disposed between the holding surfaces 35 and 38 is thereby gripped firmly.

In order to hold the gripping surfaces 35 and 38 apart to locate and release the lug 29, a roller 44 rotatably mounted on a bracket 45 affixed to the frame 25 is continuously in rolling engagement with the upper surface of the clamping element 37. The roller 44 engages the clamping element at the end portion thereof opposite the end portion engaged by the compression spring 42. There is defined along the upper surface of the clamping element 37 a cam track 46 against which the roller 44 turns whenever the slide 30 is reciprocated. The cam track 46 includes portions of raised and lowered levels. The roller 44 engages the raised level thereof when the slide is fully retracted, and in doing so pivots the clamping element 37 about the fulcrum 40 against the force of the compression spring 42 and spreads apart the holding surfaces 38 and 35. This allows a lug to be positioned between the holding surfaces before the slide 30 begins its advance. When the roller 44 engages the lower level of the track 46, the compression spring 42 is permitted to turn the clamping element 37 about the fulcrum 40 to grip the central portion of the lug 29 between the holding surfaces. Until the slide 30 returns to its retracted position, the holding surfaces continue to grip the lug.

Figure 6:
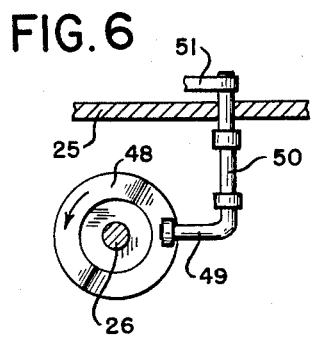
FIG. 6 is a diagrammatic fragmentary section of the cam means for operating the positioning means.
Figure 5:
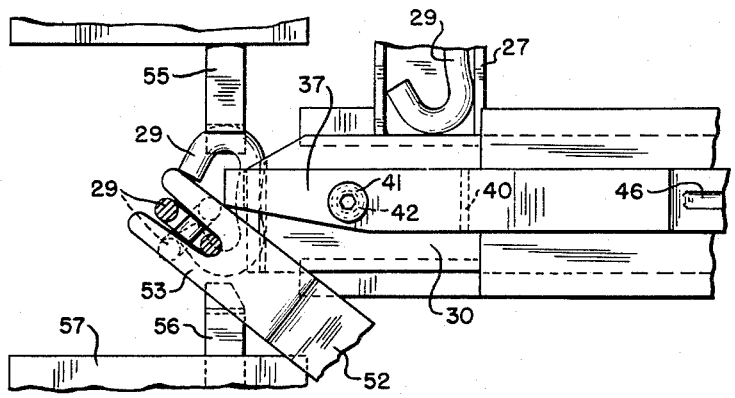
FIG. 5 is a fragmentary plan view of the clamping means, positioning means and closing dies showing the clamped lug in engagement with the endmost link on the previously formed chain.

In this apparatus, the length of previously formed chain depends freely with its end adjacent a forming station located at the outermost point of travel of the gripping end of the slide 30. The last-formed link of this depending portion of chain must be properly located such that it fits between the opposed end portions of the C-shaped lug 29 gripped on the slide 30. To achieve this, positioning means are included as shown in FIGS. 1, 5 and 6. Affixed to the primary drive shaft 26 is a second cam 48 engaged by a follower arm 49 pivotly mounted in the frame 25. Rotation of the cam 48 causes an upright portion 50 of the follower arm 49 to pivot axially through a limited number of degrees. This portion 50 extends above the upper surface of the frame 25 and has affixed thereto an elongated linkage element 51 (FIG. 1). The element 51 is in sliding engagement at its outer end with a pin extending upwardly from a second reciprocable slide 52 mounted on the frame 25. The slide 52 is adapted to move toward the forming station at an angle relative to the first reciprocable slide 30.

At the extreme end of the second slide 52 is a forked member 53 adapted to engage the depending portion of previously formed chain at the second link from the end thereof. In doing so, the endmost link is securely positioned for engagement with the C-shaped lug 29 gripped on the slide 30. Thus, when the slide 30 reaches its outermost point of advance, the opposed end portions of the gripped lug fit about one side of the endmost link. As soon as this has been accomplished the cam 48 on the shaft 26 actuates the arm 49 and withdraws the second slide 52 and the forked member 53 back to their initial position.

Figure 7:
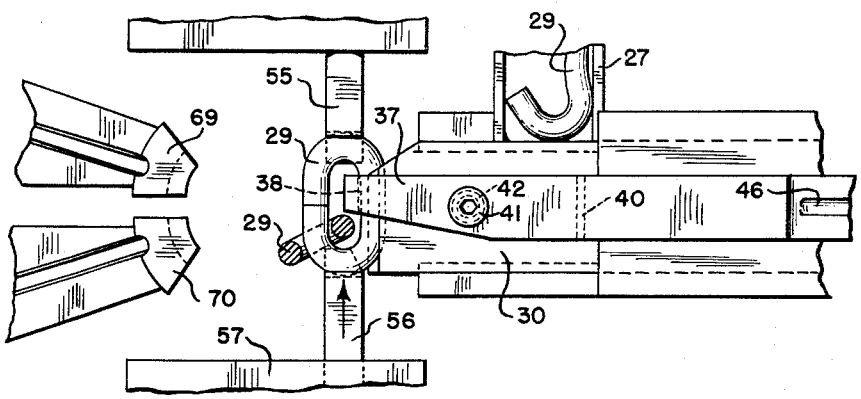
FIG. 7 is a fragmentary plan view similar to FIG. 5 with the opposed ends of the clamped lug forcibly closed together by the closing dies.

Means for closing the C-shaped lug about the endmost link of previously formed chain are shown most clearly in FIGS. 1, 7 and 8. They include a pair of opposed closing dies 55 and 56 respectively, the former being affixed to the frame 25 and the latter being mounted on a third reciprocable slide 57. The dies 55 and 56 are adapted to engage opposite rounded portions of the gripped lug 29 and close them together through the endmost link of previously formed chain as shown in FIG. 7.

This closing action of the dies 55 and 56 is accomplished by forcibly displacing the third reciprocable slide 57 toward the stationary die 55. The slide 57 is actuated by a barrel-type cam 59 (FIG. 8) affixed to the end portion of the drive shaft 26 outside the main frame 25. A cam groove 60 within the cam 59 receives a follower mounted on one end of a heavy bell-crank 61. The bell-crank 61 is pivoted about a large pin 63 affixed relative to the frame 25 and the other end of the bell-crank 61 is pivotally attached to a link 67 which is in pivotal engagement with the third reciprocable slide 57 opposite the closing die 56.

Figure 10:
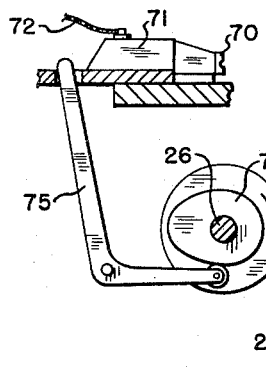
FIG. 10 is a diagrammatic fragmentary section of the cam means for operating the welding tips.
Figure 4:
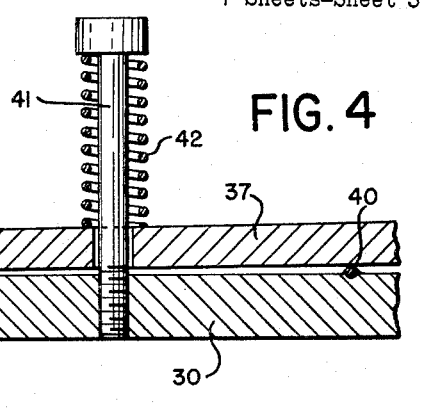
FIG. 4 is an enlarged fragmentary section of the clamping means in its initial position holding one of the lugs.
Figure 9:
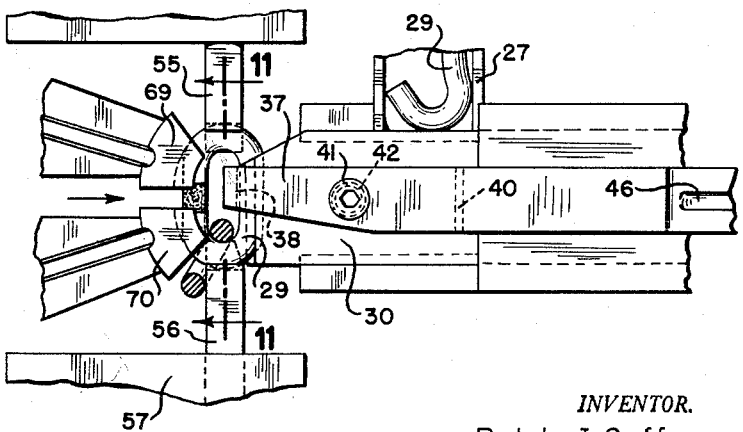
FIG. 9 is a fragmentary plan view similar to FIG. 5 showing the welding tips in operative engagement with the closed lug.

Once the lug 29 has been closed about the endmost link, welding means come into operation to bond together the cojoined lug end portions. As shown most clearly in FIGS. 9 and 10, the welding means include a pair of electrically conductive welding tips 69 and 70 mounted on a fourth reciprocable slide 71. When the slide 71 advances toward the forming position of the closed lug 29, the tips 69 and 70 fit against the cojoined lug end portions in the manner shown in FIG. 9. Current is carried from suitable transformer means to the welding tips 69 and 70 by conductors 72, the end portions of which appear in FIG. 10. The slide 71 is actuated by a fourth cam 74 affixed to the primary drive shaft 26. One end of a bell-crank 75 pivoted on the frame 25 engages the cam 74 and the opposite end of the bell-crank 75 is in sliding engagement with the reciprocable slide 71. Thus, rotation of the cam 74 effects corresponding reciprocation of the slide 71 to advance the welding tips 69 and 70 into engagement with the closed lug 29.

Figure 12:
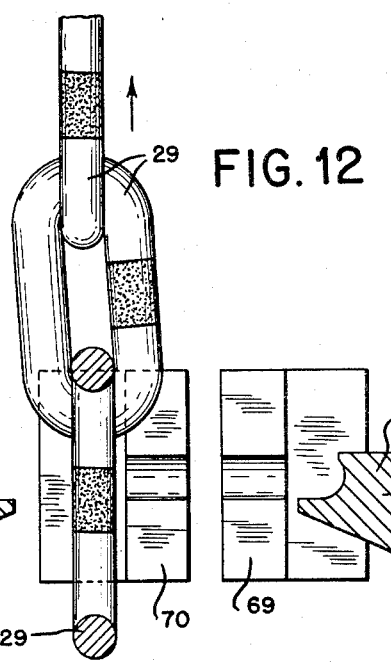
FIG. 12 is a fragmentary section similar to FIG. 11 showing the closing dies retracted and the newly formed link being raised by the indexing means.

As soon as the welding operation is completed, the tips 69 and 70 are withdrawn by the slide 71. Then, the first reciprocable slide 30 gripping the lug 29 (which is now formed into a link) withdraws and thereby releases the newly formed link. At this point, the newly formed endmost link of chain hangs below the level of the forming station between the closing dies as shown in FIG. 12. Therefore, it is necessary to raise the previously formed chain the distance of one link to bring the newly formed endmost link up to forming level to receive the next C-shaped lug. Also, the previously formed chain must be rotated axially a quarter turn so as to dispose the second link from the end at the proper angular position to be engaged by the forked member 53 of the positioning means.

Both the lifting and turning operations are accomplished by indexing means described fully with reference to FIGS. 1, 8 and 13 through 20. Mounted on the frame 25 is a superstructure 75 which extends over the forming station. The previously formed section of chain depends from the superstructure and is supported by a winch member 76. This winch member is rotatably mounted on the superstructure and includes circumferentially spaced radial pins 79 disposed about its periphery to extend through every other link of the chain. Thus, the winch member is in positive engagement with the formed length of chain.

An actuator arm 81 is pivotally mounted about the axle of the winch member 76 and a ratchet wheel 82 is affixed coaxially to that axle. A pawl 84 pivotally attached to the actuator arm 81 is spring-urged into engagement with the ratchet wheel 82. Thus, when the actuator arm 81 is pivoted upwardly, the pawl 84 turns the ratchet wheel 82 and the winch member 76. When the actuator arm 81 is pivoted downwardly, the pawl slides over the ratchet wheel and the winch member remains stationary.

The actuator arm 81 is periodically pivoted in this manner by a connecting rod 86 slidably mounted on a lever arm 87 which is pivoted to the superstructure 75. As shown in FIG. 20, the opposite end of this lever arm 87 is slidably attached to one end of another rod 88 which, in turn, is slidably attached to a second lever arm 89 pivotly mounted on the frame 25. At the opposite end of the second lever arm 89 is a cam follower 90 in operative engagement with a fifth cam 91 affixed to the drive shaft 26. Hence, rotation of the cam 91 by the drive shaft 26 transmits a turning force to the actuator arm 81 through the linkage described to periodically turn the winch member 76 and raise the previously formed section of chain the desired distance of one link after each link is formed.

To achieve the turning motion of the previously formed section of chain which is necessary for the relocation of the endmost link relative to the forked member 53 of the positioning means, an annular assembly is disposed about the lower portion of the chain as shown in FIGS. 8 and 13 through 17. This assembly includes an annulus 93 rotatably mounted in a bracket 94 extending outwardly from the superstructure 75. Within the annulus 93 are four uniformly spaced vertical guide rods 96 adapted to fit closely but slidably within the respective longitudinal quadrants of the chain. Consequently, the chain is permitted to move longitudinally with considerable freedom within the four guide rods 96 but is prevented thereby from rotating axially relative to the annulus 93. At the lowermost end of the guide rods 96 are four similarly arranged guide rollers 98 which direct the chain into engagement with the guide rods. The rollers 98 are rotatably mounted on the ends of respective arms 99 depending pivotably from a shoulder 100 at the lower end of the annulus 93. A continuous tension spring 101 (FIG. 17) encompasses the lower end of the arms 99 and urges the rollers 98 into contact with the chain entering the guide rods 96.

This entire annular assembly is periodically rotated a quarter turn in alternate directions, i.e., a quarter turn clockwise after one length is formed and then a quarter turn counter-clockwise after the next link is formed. This causes the chain to turn alternately one quarter turn in one direction and then the next so that the second link from the end can be received by the forked member 53 of the positioning means after each link is formed. The desired indexing of the formed chain is thereby achieved without introducing a cumulative axial twist throughout the chain.

Figure 14:
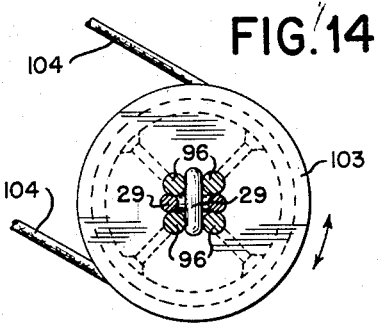
FIG. 14 is a fragmentary section taken along the line 14—14 of FIG. 13.
Figure 17:
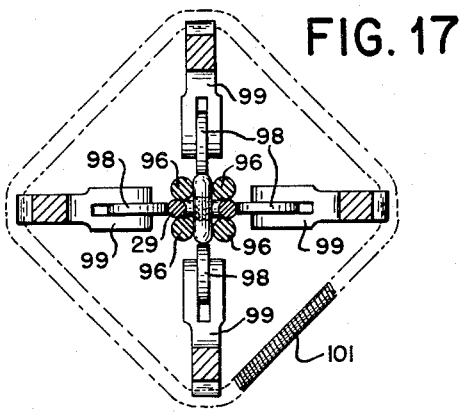
FIG. 17 is a fragmentary section taken along the line 17—17 of FIG. 13.
Figure 15:
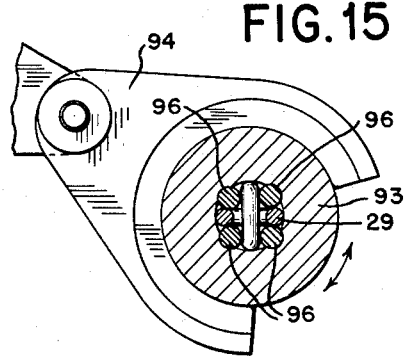
FIG. 15 is a fragmentary section taken along the line 15—15 of FIG. 13.
Figure 18:
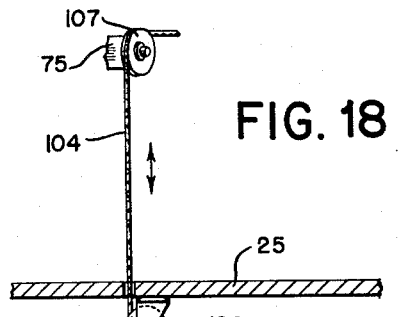
FIG. 18 is a fragmentary section taken along the line 18—18 of FIG. 8 of the cam means associated with the drive shaft for actuating the rotatable annulus of the indexing means.
Figure 16:
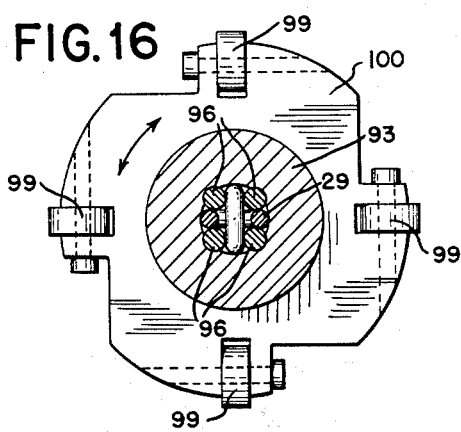
FIG. 16 is a fragmentary section taken along the line 16—16 of FIG. 13.

The means for rotating the annular assembly in alternate directions is shown in FIGS. 8, 14 and 18 and includes a sheave 103 affixed co-axially to the upper end of the annulus 93. A flexible rope 104 passes around the sheave 103. One end of the rope 104 is guided over a pulley 105 affixed to the superstructure 75 and is attached to a tension spring 106 (FIG. 8). The opposite end of the tension spring is anchored on the frame 25. The other end of the rope 104 passes over a second pulley 107 rotatably mounted on the superstructure 75 and is directed downwardly through the frame 25. As shown in FIG. 18, this end of the rope is turned over a third pulley 109 and is affixed at a bracket 110 to the frame 25.

In extending from the pulley 109 to the bracket 110, this section of the rope 104 passes chordally across the face of a sixth cam 112 affixed to the drive shaft 26. A roller 114 extends rotatably from the peripheral portion of the face of the cam 112. When the cam 112 is rotated, the roller 114 cyclically engages the chordal section of the rope 104 and displaces it angularly into the position shown in dotted lines in FIG. 18. This, of course, imparts a momentary pull on the rope 104 which is resisted by the tension spring 106 at the extreme opposite end of the rope. As soon as the roller 114 and the cam 112 displace the rope 104 to its extreme angular position, it then begins to withdraw from the rope and the spring 106 returns the rope to its initial position. In this manner, the sheave 103 on the annulus 93 is periodically turned back and forth by the rope 104. The degree of displacement of the rope by the cam 112 is such that the annulus 93 rotates the desired quarter turn when actuated by the rope 104. The entire annular assembly thereby turns back and forth a quarter turn, thus carrying with it the end portion of the chain.

The operation of the new apparatus is as follows: A section of formed chain is first applied over the winch member 76 with its end portion depending through the guide rods 96 in the annular assembly. The endmost link of chain is thereby positioned adjacent the forming station. A plurality of lugs 29 are then fed end-to-end through the feeding channel 27 until the first lug slides between the opposed holding surfaces 35 and 38 on the slide clamping element 37. The drive shaft 26 is then rotated by any suitable driving motor. Rotation of the drive shaft 26 causes the first cam 31 to rotate and the bell-crank 33 thereby reciprocates the slide 30. The slide 30 moves toward the forming station and, as soon as it does so, the roller 44 enters the lower level of the track 46 and permits the compression spring 42 to urge the clamping element 37 downwardly against the lug 29 positioned thereon.

With the lug 29 firmly gripped on the slide 30, between the holding surfaces 35 and 38, the slide 30 is advanced toward its outermost limit of travel, at which point the gripped lug is in forming position. At the same time, the second cam 48 advances the reciprocable slide 52 toward forming position so that the forked member 53 engages the second chain link from the end and thus holds the endmost link in proper position to be received by the oncoming gripped lug 29. The gripped lug and the endmost chain link then come into engagement as shown in FIG. 5.

Figure 11:
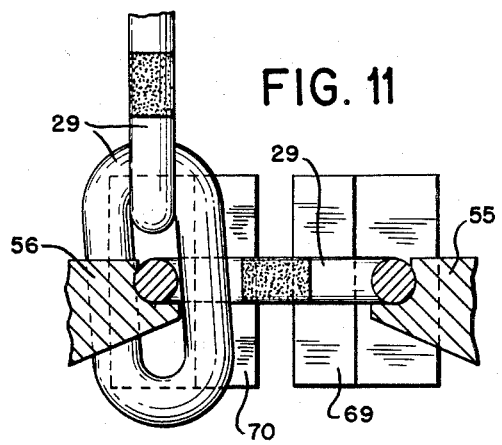
FIG. 11 is a fragmentary section taken along the line 9—9 of FIG. 9.

Next, the third cam 59 turns the bell-crank 61 to advance the slide 57 supporting the movable die 56 in a direction toward the stationary closing die 55. The clamped lug 29 is thereby squeezed between the closing dies and closed through the endmost link of formed chain as shown in FIGS. 7 and 11. The travel of the movable die 56 should be carefully controlled, of course, so that the opposed ends of the lug 29 are brought into optimum forcible contact with one another.

With the closed lug 29 still held between the closing dies, the fourth cam 74 is turned by the shaft 26 to advance the slide 71 by means of the bell-crank 75. This displaces the welding tips 69 and 70 into engagement with the closed lug end portions. Current is introduced through the welding tips to weld the cojoined lug ends together into a formed link. Then, each of the slides 30, 57 and 71 are withdrawn by their respective cams to retract the clamping element 37, the movable closing die 56 and the welding tips 69 and 70. At full retraction of the slide 30, the roller 44 rides to the higher level of he track 46 and thereby forces the holding surfaces 35 and 38 apart against the force of the spring 32. The newly formed endmost link is then allowed to drop free into the position shown in FIG. 12.

The fifth cam 91 is then turned by the drive shaft 26 to pivot the actuator arm 81 and turn the winch member 76 to a degree necessary to raise the formed chain the distance of one link. This brings the newly formed endmost link up to the proper elevation relative to the forked member 53 of the positioning means. At the same time that the formed chain is raised in this manner, it is also turned axially a quarter turn by the engagement of the roller 114 on the sixth cam 112 with the rope 104. The rope 104 rotates the sheave 103 to turn the chain within the guide rods 96 a quarter turn. As soon as the quarter turn is accomplished, the forked member 53 of the positioning means advances once more to properly relocate the formed chain and the rope 104 pulls back again under the force of the tension spring 106, leaving the chain firmly positioned by the forked member 53. At this time, another lug is brought into engagement with the endmost link for formation into the next link and the sequence of steps is repeated.

It is evident that all operations of this chain-making apparatus are synchronized by the single drive shaft 26 and its associated cams. All phases of the chain-making procedure are thereby carried out fully automatically by one assembly which is entirely integrated in its operation. One of the most noteworthy advantages to be derived from this new apparatus is that the chain it produces is exceptionally uniform in construction and quality because each cycle of operation is precisely the same as the next. Also, the fully automatic nature of the apparatus eliminates the need to transpose the chain from one separate forming station to the next, as is typical of conventional intermittent chain-making procedures.

I claim:

1. Apparatus for forming substantially C-shaped lugs into interconnected links of chain comprising a frame, a slide mounted on said frame and being reciprocable toward and away from a forming station for moving each lug successively into forming position, positioning means on said frame movable to a position adjacent said forming station for locating the endmost link of previously formed chain so that the opposed lug end portions fit about that link when said lug reaches forming position, closing dies on said frame at opposite sides of said forming station and relatively movable along a path with the relative motion being toward said forming station for forcibly closing said opposed lug end portions through said endmost link, displaceable electrical welding tips movable toward said forming station, said tips being located laterally of said path and engageable with the closed lug end portions for welding them together while said lug end portions are held by said closing dies, indexing means including movable means for operatively relocating said chain with respect to said positioning means without substantial lateral displacement of said chain preparatory to the formation of the next link, and synchronized driving means for actuating each of said slide, positioning means, closing dies, welding means and indexing means.

2. Apparatus according to claim 1 wherein said indexing means includes a structure on said frame from which said chain depends with the endmost link thereof closely adjacent said closing dies, lifting means for raising the depending portion of said chain the distance of one link after each link is formed, and rotating means for turning the depending portion of said chain a quarter turn after each link is formed.

3. Apparatus according to claim 1 wherein said positioning means comprises a movable chain-engaging member mounted on said frame, and a reciprocable second slide for advancing said member into engagement with said chain to move the endmost link thereof into position between said dies so that the opposed lug end portions fit about said link when said lug reaches forming position, said second slide being actuated by said drive means.

4. Apparatus according to claim 1 wherein said synchronized driving means comprises a single drive shaft axially rotatable on said frame, and a plurality of cams mounted on said shaft for actuating said slide, positioning means, closing dies, welding means and indexing means respectively.

5. Apparatus according to claim 1 which includes a releasable clamp on said reciprocable slide for gripping one of said C-shaped lugs remote from the opposed ends thereof, said clamps comprising a lever arm fulcrumed on said reciprocable slide, opposed holding surfaces on said lever and slide respectively at one end thereof, spring means normally urging said holding surfaces together, and displacement means mounted on said frame in engagement with said lever for moving said holding surfaces apart against the force of said spring means before said lug is moved toward forming position.

6. Apparatus for forming substantially C-shaped lugs into interconnected links of chain comprising a frame, a releasable clamp for gripping one of said C-shaped lugs remote from the opposed ends thereof, a reciprocable slide mounted on said frame and supporting said clamp for moving the lug gripped thereby into forming position, said releasable clamp comprising a lever arm fulcrumed on said reciprocable slide and secured to said slide to move therewith, opposed holding surfaces on said lever and slide respectively at one end thereof, spring means normally urging said holding surfaces together, and displacement means mounted on said frame in engagement with said lever for moving said holding surfaces apart against the force of said spring means before said lug is moved toward forming position; positioning means comprising a movable chain-engaging member mounted on said frame, and a reciprocable second slide for advancing said member into engagement with said chain to move the endmost link thereof into position so that the opposed lug end portions fit about said link when said lug reaches forming position; opposed closing dies on said frame movable relative to each other for forcibly closing said opposed lug end portions through said endmost link; displaceable welding tips engageable with the respective closed lug end portions for welding them together; indexing means comprising a structure on said frame from which said chain depends with the endmost link thereof closely adjacent said closing dies, lifting means for raising the depending portion of said chain the distance of one link after each link is formed, and rotating means for turning the depending portion of said chain a quarter turn after each link is formed; and synchronized driving means comprising a single drive shaft axially rotatable on said frame, and a plurality of cams mounted on said shaft for actuating said slide, positioning means, closing dies, welding means and indexing means respectively.

7. In apparatus for forming lugs into interconnected links of chain wherein each lug is moved from retracted to forming position by a reciprocable slide mounted on a frame, a releasable clamp for holding said lug on said slide comprising a lever arm fulcrumed on said reciprocable slide, said lever arm and slide defining respective opposed holding surfaces at one end thereof, spring means biasing said lever arm and normally urging the holding surface thereon toward the opposed holding surface on said slide, a rotatable roller fixedly mounted on said frame, a cam track on said slide in rolling engagement with said roller throughout the displacement of said reciprocable slide, said cam track being configured to turn said lever arm about its fulcrum and move said holding surfaces apart against the force of said spring means when said slide is in its retracted position.

References Cited by the Examiner
UNITED STATES PATENTS

| | | | |
|---|---|---|---|
| 512,848 | 1/94 | Thomson et al. | 59—25 |
| 528,819 | 11/94 | Standish | 59—16 |
| 1,071,700 | 9/13 | Carter | 59—23 |
| 1,624,063 | 4/27 | Olsen | 59—16 |
| 1,790,464 | 1/31 | Du Bois | 59—32 |
| 2,533,325 | 12/50 | Miller | 29—27 |

FOREIGN PATENTS 813,730  5/59  Great Britain.

WILLIAM J. STEPHENSON, *Primary Examiner.*
EDWARD C. ALLEN, CARL W. TOULIN, *Examiners.*